(12) United States Patent
Christian et al.

(10) Patent No.: US 6,311,643 B1
(45) Date of Patent: Nov. 6, 2001

(54) PREFABRICATED NOVEL BIRD CAGE

(76) Inventors: George T. Christian, 6610 Towhee La., Carlsbad, CA (US) 92009; Sally Huntington, 5634 Carnegie St., San Diego, CA (US) 92122

( * ) Notice: Subject to any disclaimer, the term of this patent is extended or adjusted under 35 U.S.C. 154(b) by 0 days.

(21) Appl. No.: 09/427,493

(22) Filed: Oct. 26, 1999

(51) Int. Cl.$^7$ .................................................. A01K 31/00
(52) U.S. Cl. ..................... 119/431; 119/428; 119/452; 119/461
(58) Field of Search ................................ 119/431, 428, 119/452, 453, 459, 461, 474; D30/110

(56) References Cited

U.S. PATENT DOCUMENTS

| | | | |
|---|---|---|---|
| D. 167,436 | * 8/1952 | Yellin | D30/110 |
| 889,191 | * 6/1908 | Bell | 119/431 |
| 984,977 | * 2/1911 | Stokes | 119/431 |
| 1,007,956 | * 11/1911 | Maurer | 119/431 |
| 1,329,104 | * 1/1920 | Ballin | 119/431 |
| 1,791,956 | * 2/1931 | Cowles | 119/431 |
| 1,911,702 | * 5/1933 | Mallgraf | 119/431 |
| 2,190,721 | * 2/1940 | Mallgraf | 119/431 |
| 2,230,305 | * 2/1941 | Mallgraf | 119/431 |
| 2,292,614 | * 8/1942 | Copeman | 119/431 |
| 2,666,414 | * 1/1954 | Burr et al. | 119/431 |
| 3,250,249 | * 5/1966 | Nelson et al. | 119/431 |
| 3,270,713 | * 9/1966 | Rubricius | 119/431 |
| 3,593,688 | * 7/1971 | Whitener | 119/453 |
| 4,484,540 | * 11/1984 | Yamamoto | 119/497 |
| 5,546,893 | * 8/1996 | Stone | 119/464 |
| 5,803,018 | * 9/1998 | Liou | 119/461 |

\* cited by examiner

Primary Examiner—Charles T. Jordan
Assistant Examiner—Judith A. Nelson
(74) Attorney, Agent, or Firm—John K. Murphey

(57) ABSTRACT

A prefabricated fully assemblable bird cage comprising a flat sheet of stiff material, a rectangular panel, formed centrally in the sheet bounded on the outside perimeter thereof by four straight prefold marginal depressions, defining respectively a top margin, opposed side margins and a bottom margin, each fold line arranged orthogonal to the other, the fold lines joined at their respective intersecting terminal ends to form a central panel of the enclosure, the rectangular panel having formed therein a large central opening, the edges of which reside in the panel; first and second end panels extending outward from the central panel including a first portion of each end panel that is arranged to be folded orthogonal to the central panel; opposed side panels extending respectively outward from the panel margins for folding toward each other in parallel arrangement to form respectively side panels of the cage; a pair of wide, short tabs extending from the straight prefold marginal edge depression formed in the bottom panel, on the opposite side thereof from the central side panel, for bending upward into parallel, spaced-apart arrangement with the central side panel and terminating along a terminal edge; and a grate, comprising a plurality of small diameter stiff wires held in spaced-apart arrangement by at least one, larger diameter support wire, the grate defined by enclosed top, bottom, and opposed side marginal edges for assembly with the folded sheet of stiff material in the side panels to complete the bird cage.

20 Claims, 4 Drawing Sheets

PREFABRICATED NOVEL BIRD CAGE

BACKGROUND OF THE INVENTION

1. Field of the Invention

This invention pertains to the field of pet enclosures. More particularly, it pertains to a singular type of animal enclosure, such as a small animal cage or bird cage, that is prefabricated from a flat sheet of stiff material, such as paper or plastic, stamped, die cut and folded to provide a plurality of cage surfaces and capable of assembly with a metal grate to form the complete enclosure. Before assembly, the flat sheet may be stacked to provide a source of numerous cages storable in a small area.

2. Description of the Prior Art

Her Beauty Was Sold for an Old Man's Gold,
She's a Bird in a Gilded Cage

This beautiful sentiment from Arthur J. Lamb's poem, "*A Bird in a Gilded Cage*" [c. 1900] reflects the public's general and continuing interest in small birds (and other animals) that are bought and sold at trade shows, pet stores, bird farms, and the like. While the birds are generally grouped in large cages for public view, individual cages are necessary to transfer or to house the singles or pairs of birds sold or otherwise traded. The problem lies in the need for so much volume in which to store individual bird cages in cars, trucks, and at the source of the birds.

Each cage occupies volume, empty volume when not in use, and a plurality of these cages can and often does strain the volume of automobiles, trucks and other vehicles that transport many of these cages to and from a source of birds. For instance, a 12"×12"×12" fully assembled cage occupies one cubic foot of volume. Rarely are there large flat surfaces on which to accurately stack such cages for transport, so that three or four cages on a car seat, stacked two or three high are all that can be transported in a typical compact car or truck cab at any one time. Such a minimal number of assembled cages restricts the ability of the bird seller to market more than a few birds at any one time before running out of transport cages that are given or sold to the purchaser of the bird.

Some bird cages are able to be transported in disassembled configuration and later assembled at the bird show, or sale mart. However, for the most part, these types of cages are made with strong wire grates to thwart the flight of a newly purchased bird from the cage and possibly from the transport vehicle. Hence, these cages are expensive because of the materials of construction, the significant effort to assemble them, and generally are not used as the final cage for the bird in the home thus resulting in a waste of this material. These cages are often not disassembled following the trip home, because of the presence of fecal matter in the cage from the bird, and are thus generally stored in fully assembled form to be discarded at a later time.

While it is necessary for at least some surfaces of a cage to remain open to the public, to display the bird and allow the potential purchaser to view the bird, talk to it, and begin to bond with it, (and the bird to do the same), and for the bird to breathe during transportation from the purchase point to the home, the inventors have found it necessary for only one such surface to remain open to public view. This allows the balance of the surfaces of the cage to remain opaque and thus capable of manufacture from inexpensive material such as paper or plastic. Further, the inventors have found that the balance of the surfaces of the cage can be conveniently made from a single sheet of low-cost paper or plastic that is stiffened by known means to provide an economical sheet of material storable in a stack in unassembled form and later assembled with one or more stiff grates to form a lightweight, but strong, cage having at least one see-through surface. The cages are thus made of inexpensive material, able to be stored in large quantities in minimum space, and are later able to be assembled into a large number of transport bird show cages.

SUMMARY OF THE INVENTION

This invention is a prefabricated fully assemblable animal (preferably bird) enclosure or cage made of a flat, stackable sheet of stiff material, the sheet preferably defined by the combination of two outer sheets of thin material held in closely spaced-apart arrangement by a plurality of parallel, spaced-apart cross-ribs. The invention includes a rectangular panel, formed centrally in the sheet that is bounded by four straight prefold marginal depressions, each defining respectively a top margin, opposed side margins and a bottom margin, arranged orthogonal to each other and joined at their intersecting terminal ends to form a center panel of the enclosure. Further included are first and second side panels extending outward from the central panel. Finally, a top panel and, separately, a bottom panel extend respectively outward from the central panel for folding toward each other in parallel arrangement to form respectively the top and bottom panels of the cage. A wide, short tab extends from a straight prefold marginal depression formed in the central panel, for bending upward into parallel arrangement with the center side panel to form a doubler for retaining a see-through grate in the enclosure. A grate, comprising a plurality of small diameter stiff wires held in spaced-apart arrangement by at least one, larger-diameter support wire and defined by enclosed top, bottom, and opposed side marginal edges for assembly with the folded sheet of stiff material in the side panels, completes the rectangular geometric enclosure.

Accordingly, the main object of this invention is a prefabricated, fully assemblable animal (preferably bird) cage made of a flat, stackable sheet of stiff material and a grate containing a planar area, the two components capable of being stored and/or carried in unassembled form in great quantities in a minimum amount of space. Other objects of the invention include a prefabricated bird cage made of inexpensive materials that is easy to assemble and disassemble and that may be easily and quickly cleaned for reuse. The enclosure is designed to have all orthogonal joints between front, rear, side, top and bottom panels sealed with flaps, tabs and the like to prevent escape of animals therefrom. The sheet is made of inexpensive material and is lightweight, flat, extremely strong, and contains prefold depressions as well as die-stamped cut-outs for easy bending and folding. The inexpensive sheet material is easily capable of stamping, impressing and die-cutting, at low cost, to provide an economical basis for the cages so that they may be purchased by persons of widely varying economic status. The materials making up the invention are non-toxic to animals and humans, and the enclosure insures that the bird or other animal will not be able to escape following assembly of the cage.

These and other objects of the invention will become more clear when one reads the following specification, taken together with the drawings that are attached hereto. The scope of protection sought by the inventors may be gleaned from a fair reading of the Claims that conclude this specification.

DESCRIPTION OF THE PREFERRED EMBODIMENT

Figure 1:
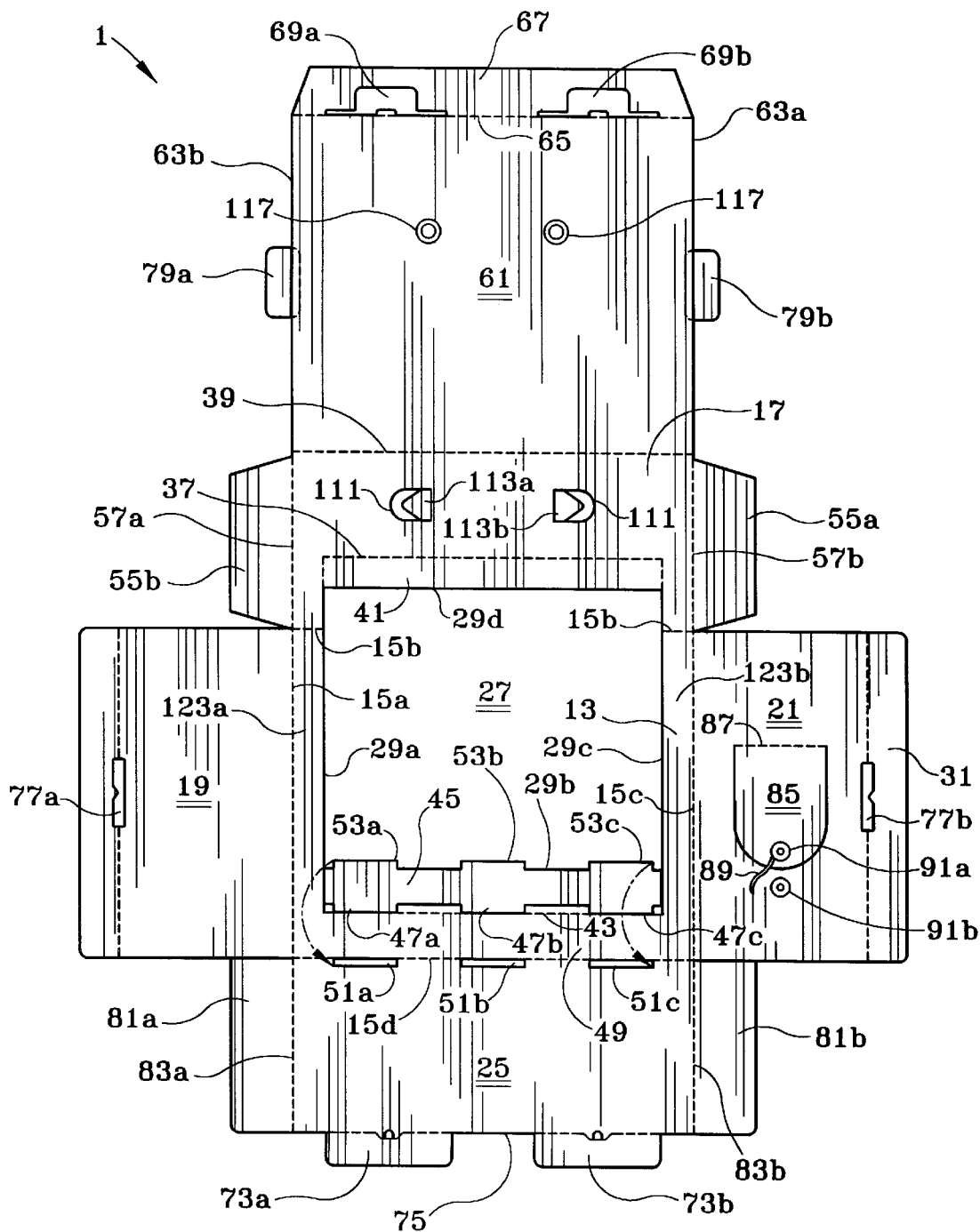
FIG. 1 is a top plan view of the flat, stackable sheet of stiff material that forms the preferred embodiment of this invention.

Turning now to the drawings, wherein elements are identified with numbers and like elements are identified with like numbers throughout the seven figures, FIG. 1 shows the flat, stackable sheet of stiff material 1 usable in the preferred embodiment of this invention to form an enclosed volumetric geometric enclosure 3 or cage (see FIG. 2) lacking at least one enclosure surface. While sheet 1 can probably be made of transparent or translucent material, for cost purposes, it is usually made of opaque material. As shown in FIG. 3, sheet 1 is preferably comprised of two outer layers 5 and 7 of thin material, such as plastic or paper or combinations thereof, held in closely spaced-apart planar parallel arrangement by a plurality of parallel, spaced-apart cross-ribs 9. Such a sheet of material is presently commercially available under the trademark HI-CORE® and produced by the KMP Plastics LLC of Fullerton, Calif. Such material is stiff, yet capable of having fold lines depressed or otherwise formed therein to aid later folding and bending of parts thereof. The material is lightweight, inexpensive, easily disinfected, easily washable in a dishwasher to remove fecal and food waste matter, and stands up to rough handling, which is a desirable trait when used with the animal or bird moving about inside the cage and children and others moving about outside the cage and touching and handling it. Sheet 1 may be easily stamped and die-cut using a conventional die and press combination to produce a ready-to-assemble part in a minimum of steps. As used herein, dashed lines are fold lines while solid lines are lines of cut.

Figure 4:
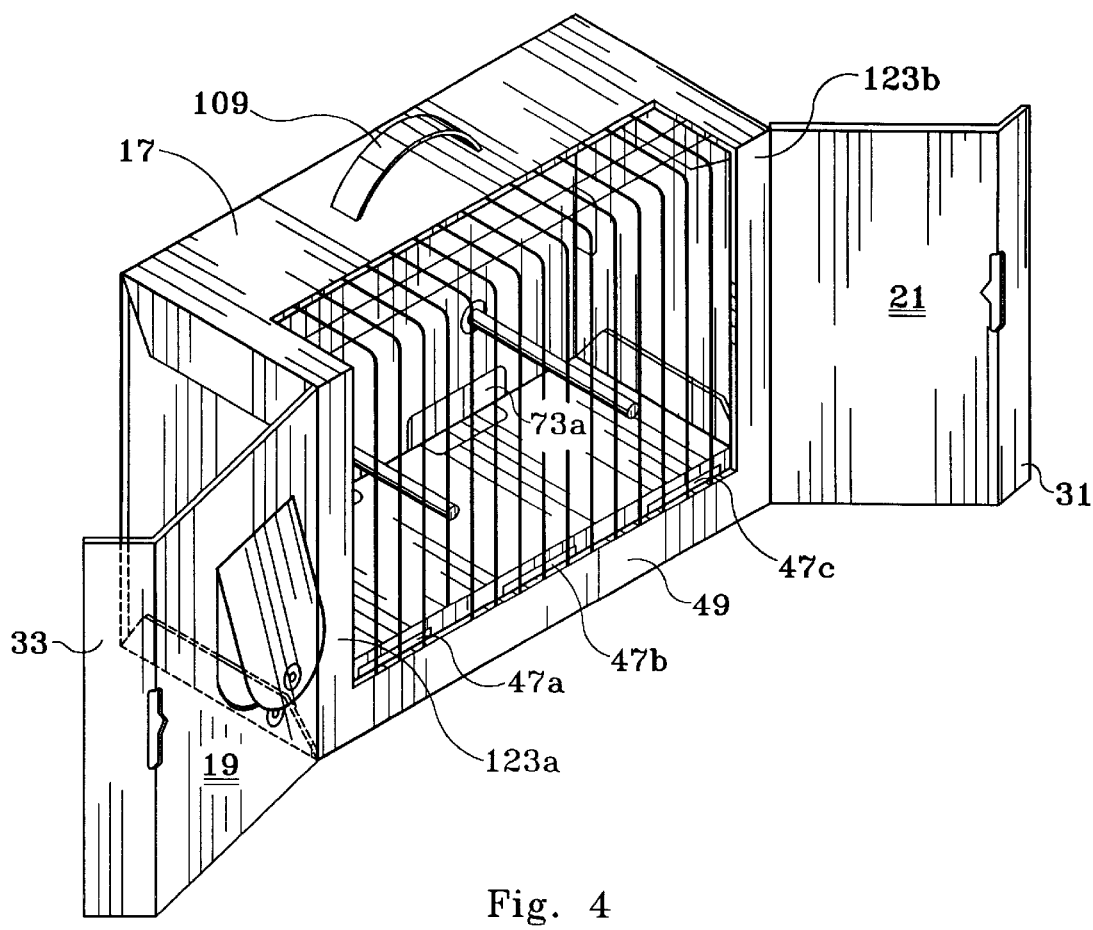
FIG. 4 is a perspective view of the enclosure shown in FIG. 2 with the side panels unfolded.
Figure 5:
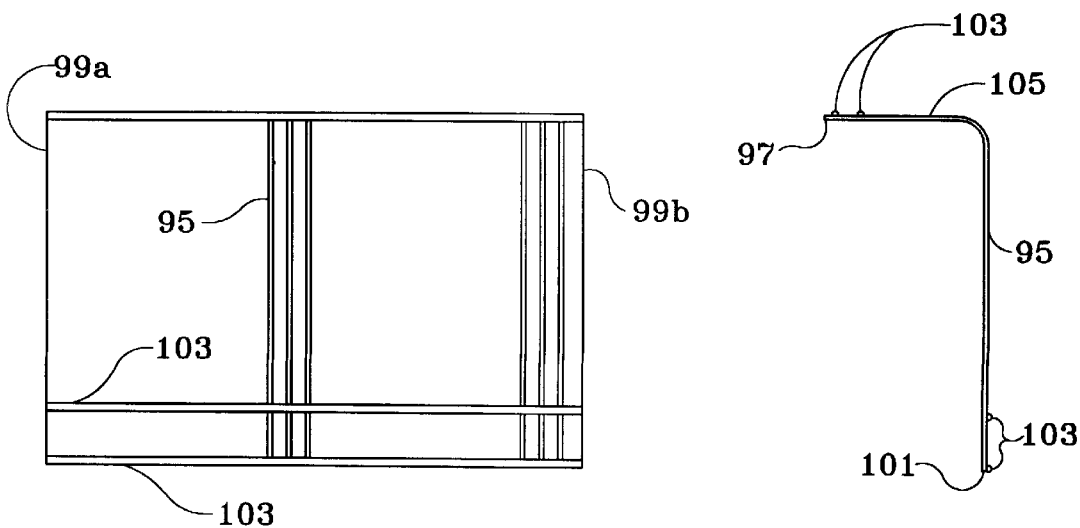
FIG. 5 is a front view of the grate of this invention.

As shown in FIG. 1, in the preferred embodiment of the invention, sheet material 1 includes a rectangular panel 13, formed centrally therein and bounded by four straight prefolded marginal depressions 15a, 15b, 15c and 15d arranged orthogonal to each other and joined at their intersecting terminal ends. Prefold depression 15b defines the top margin of central panel 13 and one of the folds of the top panel 17 of fully assembled enclosure 3. Opposed side prefold depressions 15a and 15c form the side margins of central panel 13 and one of the folds in each of the opposed, spaced-apart side panels 19 and 21 of fully assembled enclosure 3. Prefold depression 15d defines the bottom margin of central panel 13 and one of the folds on the bottom panel 25 of the fully assembled enclosure. A central opening 27 is formed rectangularly in rectangular panel 13 to act as the window to enclosure 3 and is bounded by edges 29a, 29b, 29c, and 29d. Extending from the margins of each side panels 19 and 21 are first and second outer tabs 31 and 33 that are arranged to be folded 90° as shown in FIG. 4.

Top panel 17 and, separately, bottom panel 25 extend respectively outward from said center panel 13 top margin 15b and bottom margin 15d for folding toward each other in parallel, spaced-apart arrangement to form respectively top panel 17 and bottom panel 25 of enclosure 3. In the preferred embodiment, top panel 17 extends from center panel top prefold marginal depression 15b to edge 29d where it then extends about one inch further to a fold line 37 and then extends further to another fold line 39 to not only isolate top panel 17 but form a lip 41 under which an edge of a metal grate is slipped as will hereinafter be more fully explained. Also in the preferred embodiment, bottom edge 29b of central opening 27 is cut about one inch further at each end for folding along a fold line 43 to form a flap 45 that is folded back on itself to form a doubler 49. Three elongated openings 51a, 51b, and 51c are formed along fold line 15d to allow entrance of three spaced apart tabs 53a, 53b, and 53c during the doubling of flap 45. Additionally, three other spaced-apart tabs 47a, 47b, and 47c are cut into sheet material 1 below opening edge 29b and appear following the formation of doubler 49. These tabs provide strong support along the bottom of enclosure 3 as will hereinafter be more fully explained.

A pair of short side wings 55a and 55b extend mutually outward from fold lines 57a and 57b to close against side panels 19 and 21 and seal the junction therebetween. A large back panel 61 extends outward from fold line 39 to be folded in spaced-apart parallel position behind central panel 13 and central opening 27. Central panel 61 is bounded on opposed spaced-apart parallel sides by edges 63a and 63b and on the far side by a fold line 65 and flap 67. A pair of cutouts 69a and 69b are formed in spaced-apart arrangement on flap 67 and arranged for complimentary receipt of a pair of likewise arranged tabs 73a and 73b, formed on distal edge 75, to form the top and bottom panels in spaced-apart parallel form.

A pair of cutouts 77a and 77b are formed on outer tabs 19 and 21 for complimentary receipt of a pair of tabs 79a and 79b extending outward from marginal side edges 63a and 63b to complete enclosure 3. A pair of flaps 81a and 81b extend outward from fold lines 83a and 83b to be bent orthogonal to bottom panel 25 and seal the junction between bottom panel 25 and side panels 19 and 21 in enclosure 3. A small door 85 is cut in side panel 21 and includes a fold line 87, to allow door 85 to be opened and closed. Door 85 is capable of being tied shut by a length of string 89 that is knotable between a pair of string catches 91a and 91b.

Figure 6:
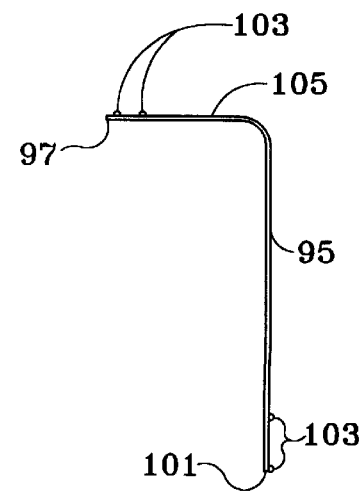
FIG. 6 is a side view of the grate shown in FIG. 5.

As shown in FIGS. 2, 4, 5 and 6, a grate 93 is provided to complete the enclosed volumetric geometric configuration of enclosure 3 and to form a see-through panel in cage 3 through which to observe the animal or bird housed therein. It is preferable that grate 93 be made as a center panel and placed opposite back panel 61 in the completed enclosure. Grate 93 is preferably made of thin lengths of metal wire 95 joined together in spaced-apart, side-by-side arrangement having spaces between each wire on the average of ⅜ to ½ inch and is defined by a top margin 97, two opposed, spaced-apart side margins 99a and 99b, and a bottom margin 101 all preferably interconnected orthogonally at their intersecting terminal ends. One or more reinforcement rods 103 are laid across or transverse to the metal wires and the wires are joined thereto by soldering or the like. The width of grate 93 is greater than the distance between side edges 29a and 29c so that the sides of central panel 27 act as holders of grate side margins 99a and 99b and hold grate 93 in central opening 27. Additionally, a narrow portion 105 of grate 93, is bent orthogonal to the main part of grate 93, as shown in FIG. 6, for slipping under lip 41 and in front of edge 29d in opening 27. In this way, a portion of grate 93 lies in two planes of enclosure 3 and provides a view partially through top panel 17 so that a person need not squat or bend down to view a bird in a cage when the cage is set on a table or other somewhat low surface. Further, flap 49 is folded over its fold line 43 to form doubler 49 and exposes three grate holding tabs for holding bottom margin 101 of grate 93 in enclosure 3. Side edges 29a and 29c, along with lip 41 and doubler 49 provide a secure peripheral boundary to grate 93 and insures that a bird or other animal housed in enclosure 3 will not push out grate 93 and escape therefrom.

Figure 2:
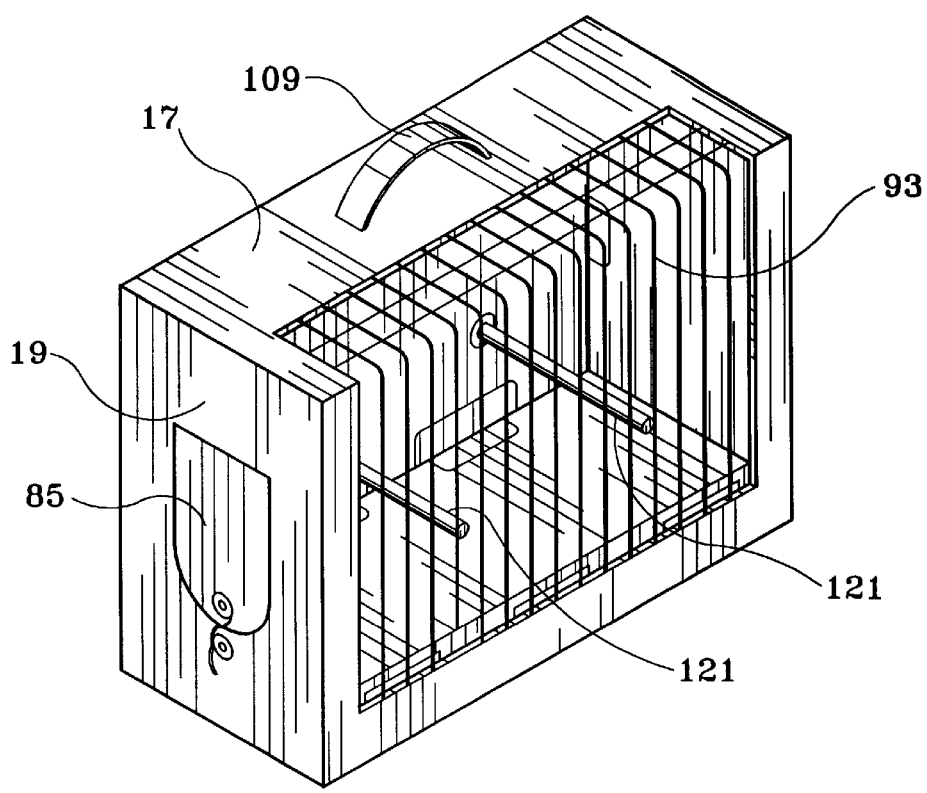
FIG. 2 is a perspective view of the enclosure made by folding the sheet material shown in FIG. 1.
Figure 3:
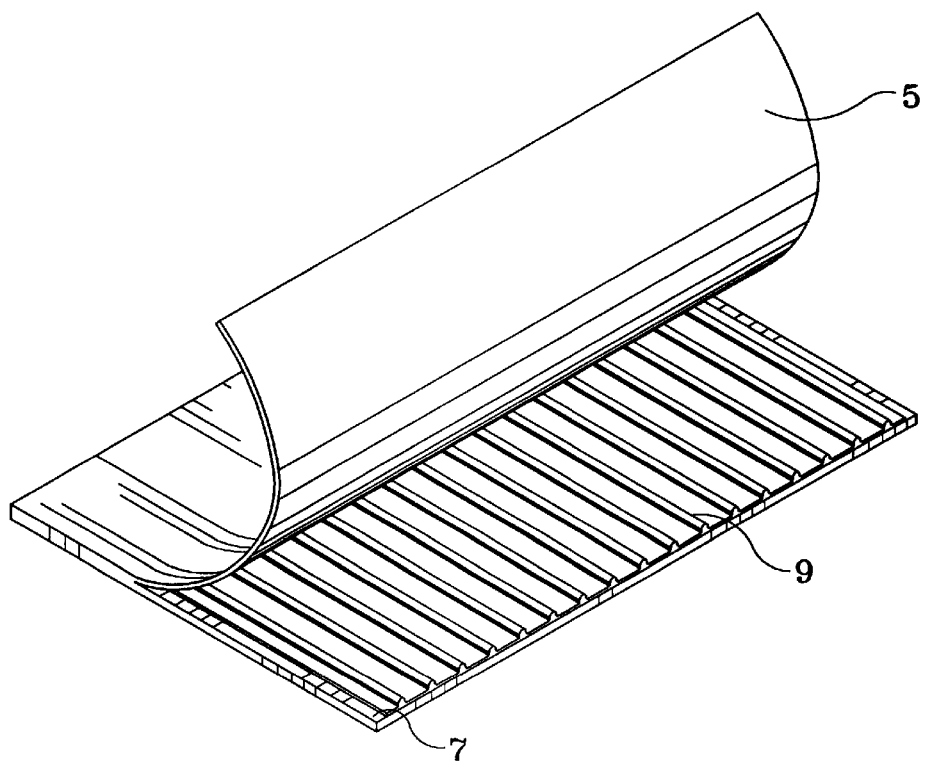
FIG. 3 is an illustrative view of the preferred form of sheet material used in this invention.

Also as shown in FIGS. 1, 2 and 4, a handle 109 is attached to top panel 17 to allow enclosure 3 to be carried, in one hand, suspended from said handle. Handle 109 is shown to be a piece of stiff plastic tape conveniently attached to top panel 17 by having the ends thereof formed into tabs 111 (see FIG. 1) at least one of which is slipped sideways through one of a pair of narrow, spaced-apart elongated openings 113a and 113b formed in top panel 17 and then rotated 90°. The other tab 111 may then be squeezed and inserted through the other opening and released to spread out and form an interconnection therebetween.

Preferably, when housing birds in enclosure 3, one or more apertures 115 is formed in one of the panels, such as back panel 61, and lined with a rubber grommet 117 through which a short length of a rod, such as a wood dowel 121, is tightly inserted into the interior of enclosure 3 to form a perch (FIGS. 2 and 4) on which the bird may sit.

Figure 7:
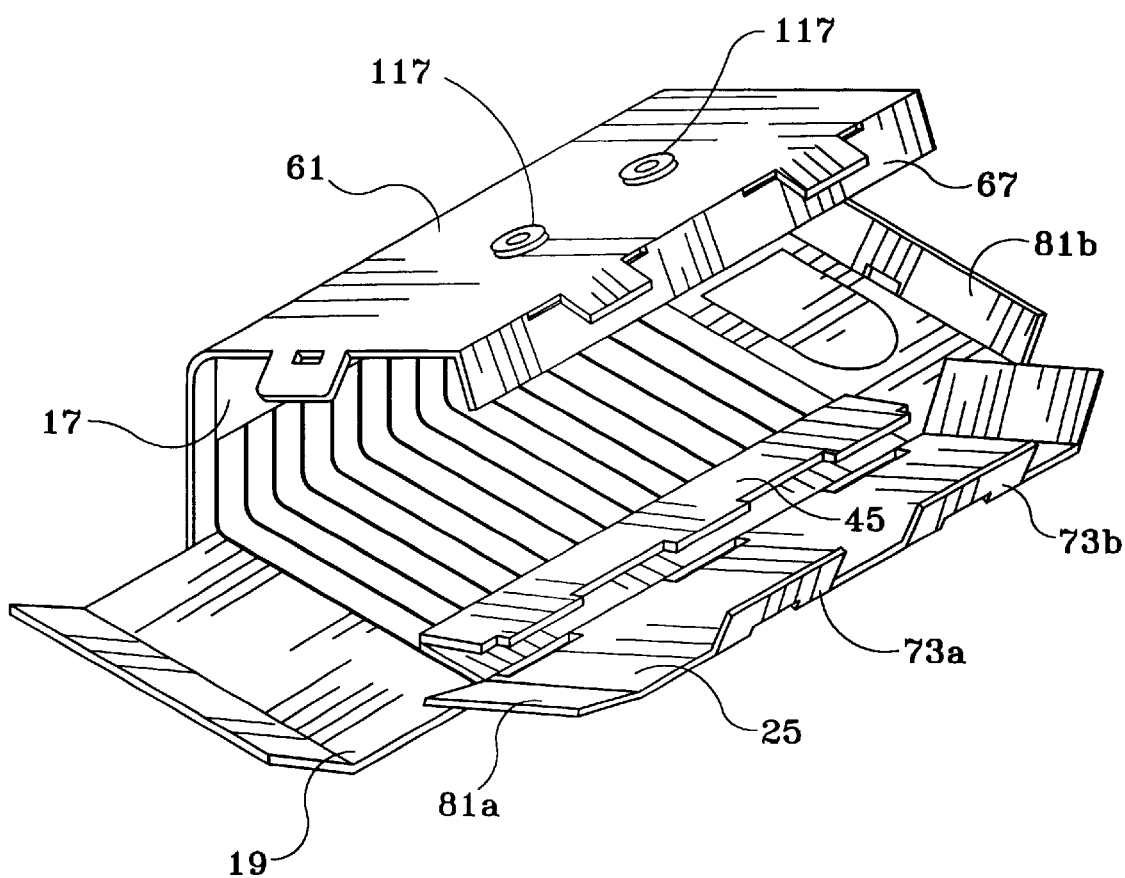
FIG. 7 is a perspective view of the invention in a partially folded configuration.

To assemble enclosure 3 from flattened sheet of stiff material 1, one bends central panel 13 at its fold lines 15a, 15b, 15c, and 15d to form right angles therewith. Flap 45 is then folded over 180° and edges or tabs 53a, 53b, and 53c inserted in respective openings 51a, 51b, and 51c to form doubler 49 and expose tabs 47a, 47b and 47c. Lip 41 is then flexed slightly inward from the plane of panel 13. Side panels 19 and 21, bottom panel 25, top panel 17 and large back panel 61 are then partially folded at their respective fold lines to form a partially completed enclosure, as shown in FIG. 7. Grate 91 is then inserted in central opening 27 of central panel 13 wherein top grate margin 97 is slipped under lip 41 and bottom grate margin 101 is slipped behind tabs 47a, 47b and 47c and inside of central panel side strips 123a and 123b. Top panel side wings 55a and 55b are then folded down inside side panels 19 and 21 to seal the junction therebetween. Large back panel 61 is then folded over grate 93, parallel to central panel 13, and bottom panel 25 joined to back panel 61 with tabs 73a and 73b inserted into slots 69a and 69b with flaps 81a and 81b folded inside to seal the junction therebetween. Tabs 79a and 79b, extending outward from side edges 63a and 63b of large back panel 61, are then inserted in cutouts 77a and 77b to complete enclosure 3. The arrangement of outer tabs 31 and 33, side wings 55a and 55b flap 67, flaps 81a and 81b insure that all orthogonal junctions between central panel 13, side panels 19 and 21, top and bottom panels 17 and 25, and back panel and bottom panel 61 and 25 are all sealed to prevent escape of birds or animals contained within enclosure 3.

While the invention has been described with reference to a particular embodiment thereof, those skilled in the art will be able to make various modifications to the described embodiment of the invention without departing from the true spirit and scope thereof. It is intended that all combinations of members and steps which perform substantially the same function in substantially the same way to achieve substantially the same result are within the scope of this invention.

What is claimed is:

1. A prefabricated fully assemblable animal enclosure comprising:
   a) a flat sheet of stiff material defining a plurality of panel surfaces that are foldable into a geometric configuration forming said enclosure, including a plurality of pre-folded linear depressions impressed into said sheet material to control the folds thereof along said depressions, said sheet lacking at least one complete enclosure surface; and,
   b) at least one grate, comprising a plurality of stiff filaments held in planar, spaced-apart arrangement, assembled with said folded sheet of stiff material to complete said enclosed geometric configuration.

2. The prefabricated fully assemblable animal enclosure of claim 1 further including an openable and closable door formed in one surface of said sheet material for allowing controlled access to the interior of said enclosure.

3. The prefabricated fully assemblable animal enclosure of claim 1 wherein at least a portion of said sheet is folded back upon itself to form a doubler when forming said enclosure.

4. The prefabricated fully assemblable animal enclosure of claim 1 further including handle means attached to one surface of said enclosure to enable said enclosure to be carried with one hand.

5. The prefabricated fully assemblable animal enclosure of claim 1 wherein one said panel of said flat sheet of stiff material is centralized therein with said other panels extending outward from the periphery thereof for folding substantially orthogonal to said center panel in forming said geometric configuration lacking at least one complete enclosure surface.

6. The prefabricated fully assemblable animal enclosure of claim 1 wherein said grate is defined by a plurality of enclosed marginal edges and is assemblable with said folded panels along said marginal edges.

7. A prefabricated fully assemblable bird cage comprising:
   a) a flat sheet of stiff paper material defining a plurality of panel surfaces that are foldable into a rectangular geometric configuration forming a volumetric enclosure lacking at least one fully enclosed surface; and,
   b) at least one grate, comprising a plurality of stiff metal wires held in planar, spaced-apart, arrangement for assembly with said folded sheet of stiff material to complete said rectangular geometric enclosure;
   c) wherein said grate is substantially planar but having a short bent portion wherein both said planar grate and said short bent portion form part of said cage.

8. The prefabricated fully assemblable bird cage of claim 7 wherein said grate is located on two different planes of said cage.

9. The prefabricated fully assemblable bird cage of claim 7 further including a plurality of straight, narrow, linear depressions impressed into said sheet material to outline at least one edge of each foldable panel and control the folds thereof along preplanned lines.

10. The prefabricated fully assemblable bird cage of claim 7 further including at least one aperture formed in one of said panels for holding a short length of rod to act as a perch for the animal housed inside said cage.

11. The prefabricated fully assemblable bird cage of claim 7 wherein at least a portion of said sheet is folded back upon itself adjacent said grate to make a doubler and provide a strong junction with said grate when forming said cage.

12. The prefabricated fully assemblable bird cage of claim 7 further including handle means attached to said panel, said handle means defined by handle ends that are formed into tabs at least one of which is arranged for passing sideways through a pair of narrow, spaced-apart slots, formed in said top panel, and then rotated 90° to enable said enclosure to be suspended therefrom and carried with one hand.

13. The prefabricated fully assemblable bird cage of claim 7 wherein one panel of said flat sheet of stiff material is centralized therein, to form a central panel, and surrounded by prefold depressions at the periphery thereof, with said other panels extending outward from said depressions and periphery for folding substantially at right angles to said central panel to form respectively the side panels, a top panel and a bottom panel of said cage.

14. The prefabricated fully assemblable bird cage of claim 7 wherein said grate is defined by a plurality of enclosed marginal edges, each said marginal edge formed orthogonal to said adjacent marginal edge and assemblable with said folded panels along said marginal edges.

15. A prefabricated fully assemblable bird cage comprising:
   a) a flat, stackable sheet of stiff material, said sheet defined by the combination of two outer sheets of thin material held in closely spaced-apart arrangement by a plurality of parallel, spaced-apart cross-ribs, said sheet defining a plurality of panel surfaces that are foldable about a central panel formed therein into a rectangular geometric configuration forming a volumetric enclosure lacking at least one enclosing surface; and,
   b) a grate, comprising a plurality of stiff wires held in planar, spaced-apart, arrangement for assembly with said folded sheet of stiff material to complete said volumetric rectangular geometric enclosure.

16. The prefabricated fully assemblable bird cage of claim 15 wherein said grate forms a central panel of said cage opposite and spaced-apart from said central panel formed in said sheet of stiff material.

17. The prefabricated fully assemblable bird cage of claim 15 wherein said central panel is bounded on opposite sides by first and second panels that ultimately form the spaced-apart side panels of said volumetric rectangular geometric configured cage and wherein each of said first and second side panels include a portion thereof that is to be used to hold said grate in final position in said cage.

18. The prefabricated fully assemblable bird cage of claim 15 wherein said grate is located on two different planes of said cage.

19. A prefabricated fully assemblable bird cage comprising:
   a) a flat sheet of stiff material;
   b) a rectangular panel, formed centrally in said sheet bounded on the outside perimeter thereof by four straight prefold marginal depressions, defining respectively a top margin, opposed side margins and a bottom margin, each said fold line arranged orthogonal to the other, said fold lines joined at their respective intersecting terminal ends to form a central panel of said enclosure;
   c) said rectangular panel having formed therein a large central opening the edges of which reside in said panel;
   d) first and second end panels extending outward from said central panel including a first portion of each end panel that is arranged to be folded orthogonal to said central panel;
   e) opposed side panels extending respectively outward from said panel margins for folding toward each other in parallel arrangement to form respectively side panels of said cage;
   f) a pair of wide, short tabs extending from the straight prefold marginal edge depression formed in said bottom panel, on the opposite side thereof from said central side panel, for bending upward into parallel, spaced-apart arrangement with said central side panel and terminating along a terminal edge; and,
   g) a grate, comprising a plurality of small diameter stiff wires held in spaced-apart arrangement by at least one, larger diameter support wire, said grate defined by enclosed top, bottom, and opposed side marginal edges for assembly with said folded sheet of stiff material in said side panels to complete said bird cage.

20. The prefabricated fully assemblable animal enclosure of claim 19 further including handle means attached to one surface of said enclosure to enable said enclosure to be carried with one hand.

* * * * *